F. D. HUBBARD & MARY E. GARNHAM.
MILK COOLER OR WARMER.
No. 176,862. Patented May 2, 1876.
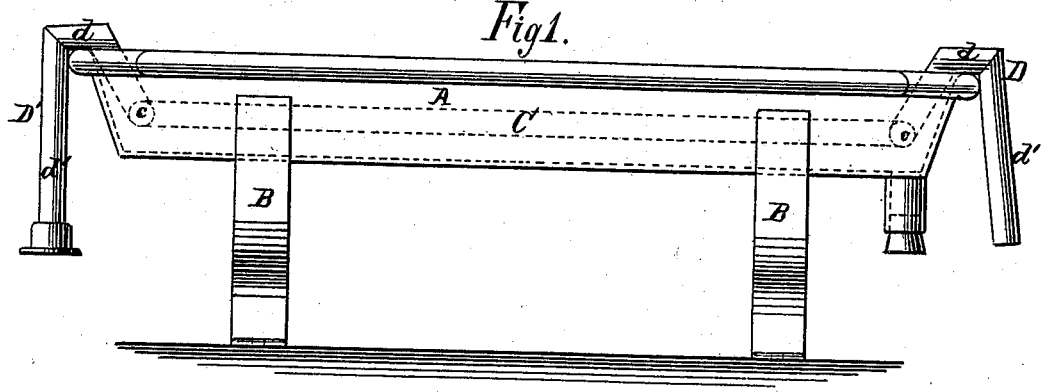
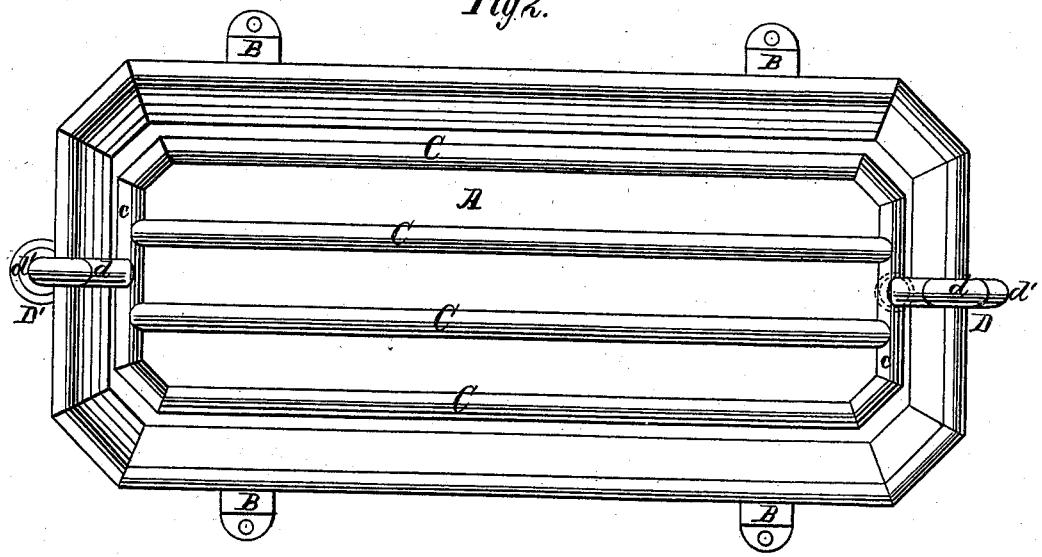
Witnesses:
Theodore Hester.
R. S. Clark
Inventor:
Fernando D. Hubbard
Mary E. Garnham
By Fitch & Fitch
Attys.

UNITED STATES PATENT OFFICE.

FERNANDO D. HUBBARD AND MARY E. GARNHAM, OF CARTHAGE, N. Y.

IMPROVEMENT IN MILK COOLERS OR WARMERS.

Specification forming part of Letters Patent No. 176,862, dated May 2, 1876; application filed March 17, 1876.

*To all whom it may concern:*

Be it known that we, FERNANDO D. HUBBARD and MARY E. GARNHAM, both of Carthage, county of Jefferson and State of New York, have invented an Improved Apparatus for Regulating the Temperature of Milk in Pans, of which the following is a full, clear, and exact description, reference being had to the accompanying drawings, forming part of this specification.

Our invention relates to the regulating of the temperature of milk in the pans of a dairy; and it consists in a series of connected tubes or pipes suspended in the pans near the bottom thereof, and provided with an inlet and outlet pipe at either end, respectively, and outside of the pan, whereby water of the temperature desired to be imparted to the milk may be passed slowly through the tubes, and thus either cool or heat the milk contained in the pan, as hereinafter particularly set forth.

Figure 1 is a side elevation of a dairy milk-pan, showing our apparatus in position therein; and Fig. 2 is a plan of the same.

A is the milk-pan. This is usually and preferably mounted upon standards B, or in any other way raised to a convenient height. C is the series of pipe, which are arranged to extend longitudinally along the pan and connected at the ends by the pipes $c$, into which the series of pipes open, whereby all the pipes are united, and a continuous channel is formed through them. As many pipes C should be employed as, placed side by side at desired distances, shall extend across the pan laterally, as shown in Fig. 2. At one end of the pipes C there opens into the cross-pipe $c$ the induction-tube D. At the other end, similarly arranged, is the eduction-tube D'. These tubes are formed each with the curve or elbow $d$, and so constructed and arranged that the crotch of the elbow will rest upon the rim of the pan and suspend the pipes C in the pan near the bottom thereof, but without contact with it. The outer ends $d'$ of these tubes depend from the crotch of the elbow outside of the pan.

Now, it is evident that by means of this apparatus water, having the desired temperature, may be pumped, or otherwise caused to circulate, up through the induction-tube into and through the set of pipes C, and, imparting its temperature to the milk, pass continually out through the eduction-tube, and by this means an effectual apparatus is provided for regulating or maintaining the temperature of the milk at any desired degree.

What we claim as our invention, and desire to secure by Letters Patent, is—

An apparatus for maintaining or regulating the temperature of milk in dairy-pans, consisting of the series of pipes C placed side by side at intervals across the width, and extending in right lines the length of the pan A, and united at the ends by the pipes $c$, together with the induction and eduction tubes D and D', respectively formed with the elbows $d$, whereby the apparatus is suspended near the bottom of the said pan A, as described.

FERNANDO D. HUBBARD.
MARY E. GARNHAM.

Witnesses:
F. L. BONES,
EGBERT E. WILMOTT.